United States Patent
Yu et al.

(10) Patent No.: US 12,231,207 B2
(45) Date of Patent: Feb. 18, 2025

(54) METHODS AND APPARATUS FOR BEAM FAILURE DETECTION REFERENCE SIGNAL DETERMINATION

(71) Applicant: SHARP KABUSHIKI KAISHA, Sakai (JP)

(72) Inventors: Chia-Hao Yu, Taipei (TW); Wan-Chen Lin, Taipei (TW); Chien-Chun Cheng, Taipei (TW)

(73) Assignee: SHARP KABUSHIKI KAISHA, Osaka (JP)

( * ) Notice: Subject to any disclaimer, the term of this patent is extended or adjusted under 35 U.S.C. 154(b) by 364 days.

(21) Appl. No.: 17/800,778

(22) PCT Filed: Mar. 3, 2021

(86) PCT No.: PCT/CN2021/078817
§ 371 (c)(1),
(2) Date: Aug. 18, 2022

(87) PCT Pub. No.: WO2021/175237
PCT Pub. Date: Sep. 10, 2021

(65) Prior Publication Data
US 2023/0106244 A1    Apr. 6, 2023

Related U.S. Application Data

(60) Provisional application No. 62/984,740, filed on Mar. 3, 2020.

(51) Int. Cl.
*H04B 7/06* (2006.01)
*H04L 5/00* (2006.01)

(52) U.S. Cl.
CPC ......... *H04B 7/0695* (2013.01); *H04L 5/0035* (2013.01)

(58) Field of Classification Search
CPC .................... H04B 7/0695; H04L 5/0035
See application file for complete search history.

(56) References Cited

U.S. PATENT DOCUMENTS

2020/0045709 A1    2/2020 Seo et al.

FOREIGN PATENT DOCUMENTS

| CN | 110708714 A | 1/2020 |
| WO | 2019215389 A2 | 11/2019 |

(Continued)

OTHER PUBLICATIONS

Zte et al., "Consideration on TCI state MAC CE for mTRP mPDCCH transmissios", R2-2001465, 3GPP TSG-RAN WG2 #108, Feb. 14, 2020(Feb. 14, 2020), sections 2-3.

(Continued)

*Primary Examiner* — Natasha W Cosme
(74) *Attorney, Agent, or Firm* — ScienBiziP, P.C.

(57) ABSTRACT

A method and apparatus for determining a BFD RS are provided. The method includes receiving at least one MAC CE for TCI state activation, each MAC CE indicating a CORESET and at least one TCI state, at least a subset of the indicated TCI state(s) belonging to a first group of TCI states associated with a first TRP; and performing first operations after determining that a total number of TCI states included in the first group of TCI states is larger than a first threshold number, the first operations including: selecting at least one first TCI state from the first group of TCI states; and determining at least one first BFD RS for detecting a first beam failure condition of the first TRP based on the at least one first TCI state.

10 Claims, 10 Drawing Sheets

(56) References Cited

FOREIGN PATENT DOCUMENTS

| WO | 2020033549 A1 | 2/2020 |
|---|---|---|
| WO | 2020063334 A1 | 4/2020 |

OTHER PUBLICATIONS

3GPP TS 38.321, "3rd Generation Partnership Project; Technical Specification Group Radio Access Network; NR; Medium Access Control (MAC) protocol specification (Release 15)", Technical Specification, V15.8.0 (Dec. 2019).

3GPP TS 38.213, "3rd Generation Partnership Project; Technical Specification Group Radio Access Network; NR; Physical layer procedures for control (Release 16)", Technical Specification, V16.0.0 (Dec. 2019).

3GPP TS 38.331, "3rd Generation Partnership Project; Technical Specification Group Radio Access Network; NR; Radio Resource Control (RRC) protocol specification (Release 15)", Technical Specification, V15.8.0 (Dec. 2019).

METHODS AND APPARATUS FOR BEAM FAILURE DETECTION REFERENCE SIGNAL DETERMINATION

CROSS-REFERENCE TO RELATED APPLICATION(S)

The present disclosure is the National Stage of International Patent Application Serial No. PCT/CN2021/078817, filed on Mar. 3, 2021, which claims the benefit of and priority to U.S. Provisional Patent Application Ser. No. 62/984,740, filed on Mar. 3, 2020. The contents of each of the above-mentioned applications are hereby fully incorporated herein by reference for all purposes.

FIELD

The present disclosure is generally related to wireless communication and, more specifically, to methods and apparatus for Beam Failure Detection (BFD) Reference Signal (RS) determination.

BACKGROUND

With the tremendous growth in the number of connected devices and the rapid increase in user/network traffic volume, various efforts have been made to improve different aspects of wireless communication for the next-generation wireless communication system, such as the fifth-generation (5G) New Radio (NR) system, by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to methods and apparatuses (e.g., User Equipment (UE)) for BFD RS determination.

According to an aspect of the present disclosure, a method performed by a UE configured with more than one Transmission/Reception Points (TRPs) in an active Bandwidth Part (BWP) for determining a BFD RS is provided. The method includes receiving at least one Medium Access Control (MAC) Control Element (CE) for Transmission Configuration Indicator (TCI) state activation, each of the at least one MAC CE indicating a Control Resource Set (CORESET) and at least one TCI state to be activated for monitoring a Physical Downlink Control Channel (PDCCH) associated with a physical resource, the physical resource being determined by a configuration of the CORESET indicated by a same MAC CE, one of the at least one MAC CE indicating more than one TCI state, at least a subset of all TCI states indicated by the at least one MAC CE belonging to a first group of TCI states associated with a first TRP; and performing first operations after determining that a total number of TCI states included in the first group of TCI states is larger than a first threshold number, the first operations including: selecting at least one first TCI state from the first group of TCI states, a total number of the at least one first TCI state being equal to the first threshold number; and determining at least one first BFD RS for detecting a first beam failure condition of the first TRP based on the at least one first TCI state.

According to another aspect of the present disclosure, a UE configured with more than one TRP in an active BWP for BFD RS determination is provided. The UE includes at least one processor and at least one memory coupled to the at least one processor, wherein the at least one memory stores at least one computer-executable program that, when executed by the at least one processor, causes the UE to: receive at least one MAC CE for TCI state activation, each of the at least one MAC CE indicating a CORESET and at least one TCI state to be activated for monitoring a PDCCH associated with a physical resource, the physical resource being determined by a configuration of the CORESET indicated by a same MAC CE, one of the at least one MAC CE indicating more than one TCI state, at least a subset of all TCI states indicated by the at least one MAC CE belonging to a first group of TCI states associated with a first TRP; and perform first operations after determining that a total number of TCI states included in the first group of TCI states is larger than a first threshold number, the first operations including: selecting at least one first TCI state from the first group of TCI states, a total number of the at least one first TCI state being equal to the first threshold number; and determining at least one first BFD RS for detecting a first beam failure condition of the first TRP based on the at least one first TCI state.

BRIEF DESCRIPTION OF THE DRAWINGS

Aspects of the present disclosure are best understood from the following detailed disclosure when read with the accompanying figures. Various features are not drawn to scale. Dimensions of various features may be arbitrarily increased or reduced for clarity of discussion.

DESCRIPTION

Figure 1:
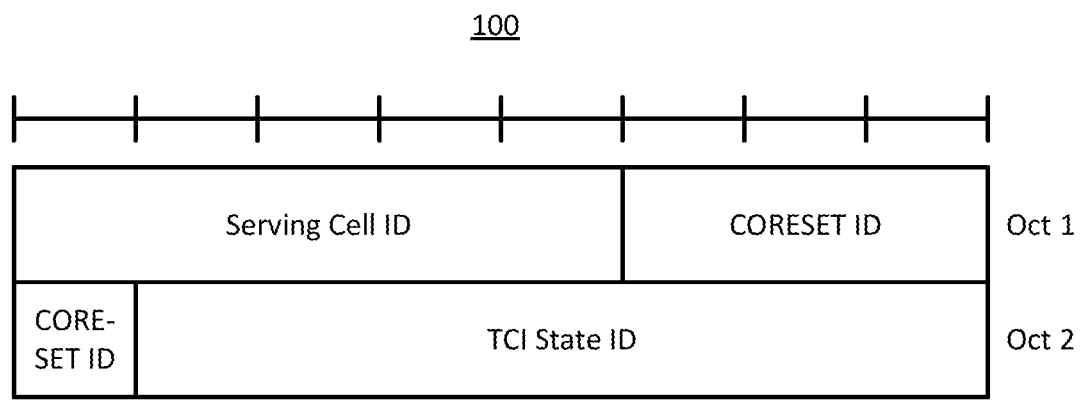
FIG. 1 illustrates a MAC CE format according to an implementation of the present disclosure.

The following contains specific information pertaining to example implementations in the present disclosure. The drawings and their accompanying detailed disclosure are directed to merely example implementations of the present disclosure. However, the present disclosure is not limited to merely these example implementations. Other variations and implementations of the present disclosure will occur to those skilled in the art. Unless noted otherwise, like or corresponding elements among the figures may be indicated by like or corresponding reference numerals. Moreover, the drawings and illustrations in the present disclosure are generally not to scale and are not intended to correspond to actual relative dimensions.

For consistency and ease of understanding, like features are identified (although, in some examples, not illustrated) by numerals in the example figures. However, the features in different implementations may differ in other respects, and thus shall not be narrowly confined to what is illustrated in the figures.

References to "one implementation," "an implementation," "example implementation," "various implementations," "some implementations," "implementations of the present disclosure," etc., may indicate that the implementation(s) of the present disclosure may include a specific feature, structure, or characteristic, but not every possible implementation of the present disclosure necessarily includes the specific feature, structure, or characteristic. Further, repeated use of the phrases "in one implementation," "in an example implementation," or "an implementation," does not necessarily refer to the same implementation, although they may. Moreover, any use of phrases like "implementations" in connection with "the present disclosure" are never meant to characterize that all implementations of the present disclosure must include the specific feature, structure, or characteristic, and should instead be understood to mean "at least some implementations of the present disclosure" include the stated specific feature, structure, or characteristic. The term "coupled" is defined as connected, whether directly or indirectly through intervening components, and is not necessarily limited to physical connections. The term "comprising," when utilized, means "including but not necessarily limited to"; it specifically indicates open-ended inclusion or membership in the disclosed combination, group, series, and the equivalent. The terms "system" and "network" in the present disclosure may be used interchangeably.

The term "and/or" herein is only an association relationship for describing associated objects and represents that three relationships may exist. For example, A and/or B may represent that: A exists alone, A and B exist at the same time, and B exists alone. "A and/or B and/or C" may represent that at least one of A, B, and C exists. The character "/" used herein generally represents that the former and latter associated objects are in an "or" relationship.

Additionally, for a non-limiting explanation, specific details, such as functional entities, techniques, protocols, standards, and the like, are set forth for providing an understanding of the disclosed technology. In other examples, detailed disclosure of well-known methods, technologies, systems, architectures, and the like are omitted so as not to obscure the present disclosure with unnecessary details.

Persons skilled in the art will immediately recognize that any network function(s) or algorithm(s) may be implemented by hardware, software, or a combination of software and hardware. Disclosed functions may correspond to modules that may be software, hardware, firmware, or any combination thereof. The software implementation may include computer-executable instructions stored on a computer-readable medium such as memory or other types of storage devices. For example, one or more microprocessors or general-purpose computers with communication processing capability may be programmed with corresponding executable instructions and carry out the disclosed network function(s) or algorithm(s). The microprocessors or general-purpose computers may be formed of Application-Specific Integrated Circuits (ASICs), programmable logic arrays, and/or one or more Digital Signal Processors (DSPs). Although some of the example implementations disclosed are oriented to software installed and executing on computer hardware, alternative example implementations implemented as firmware, as hardware, or as a combination of hardware and software are well within the scope of the present disclosure.

The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture (e.g., a Long-Term Evolution (LTE) system, an LTE-Advanced (LTE-A) system, or an LTE-Advanced Pro system) may typically include at least one Base Station (BS), at least one UE, and one or more optional network elements that provide connection towards a network. The UE may communicate with the network (e.g., a Core Network (CN), an Evolved Packet Core (EPC) network, an Evolved Universal Terrestrial Radio Access Network (E-UTRAN), a Next-Generation Core (NGC), or an Internet) through a Radio Access Network (RAN) established by the BS.

A UE according to the present disclosure may include, but is not limited to, a mobile station, a mobile terminal or device, or a user communication radio terminal. For example, a UE may be a portable radio equipment, which includes, but is not limited to, a mobile phone, a tablet, a wearable device, a sensor, or a Personal Digital Assistant (PDA) with wireless communication capability. The UE may be configured to receive and transmit signals over an air interface to one or more cells in an RAN.

A BS according to the present disclosure may include, but is not limited to, a Node B (NB) as in the Universal Mobile Telecommunication System (UMTS), an evolved Node B (eNB) as in the LTE-A, a Radio Network Controller (RNC) as in the UMTS, a Base Station Controller (BSC) as in the Global System for Mobile communications (GSM)/GSM Enhanced Data rates for GSM Evolution (EDGE) Radio Access Network (GERAN), a next-generation eNB (ng-eNB) as in an Evolved Universal Terrestrial Radio Access (E-UTRA) BS in connection with the 5GC, a next-generation Node B (gNB) as in the 5G Access Network (5G-AN), and any other apparatus capable of controlling radio communication and managing radio resources within a cell. The BS may connect to serve the one or more UEs through a radio interface to the network.

The BS may be configured to provide communication services according to at least one of the following Radio Access Technologies (RATs): Worldwide Interoperability for Microwave Access (WiMAX), GSM (often referred to as 2G), GERAN, General Packet Radio Service (GPRS), UMTS (often referred to as 3G) based on basic Wideband-Code Division Multiple Access (W-CDMA), High-Speed Packet Access (HSPA), LTE, LTE-A, enhanced LTE (eLTE), NR (often referred to as 5G), and LTE-A Pro. However, the scope of the present disclosure should not be limited to the protocols mentioned previously.

The BS may be operable to provide radio coverage to a specific geographical area using a plurality of cells included in the RAN. The BS may support the operations of the cells. Each cell may be operable to provide services to at least one UE within its radio coverage. Specifically, each cell (often referred to as a serving cell) may provide services to serve one or more UEs within its radio coverage (e.g., each cell schedules the Downlink (DL) and optionally Uplink (UL) resources to at least one UE within its radio coverage for DL and optionally UL packet transmission). The BS may communicate with one or more UEs in the radio communication system through the plurality of cells.

A cell may allocate Sidelink (SL) resources for supporting Proximity Service (ProSe), LTE SL services, and LTE/NR Vehicle-to-Everything (V2X) services. Each cell may have overlapped coverage areas with other cells. In Multi-RAT Dual Connectivity (MR-DC) cases, the primary cell of a Master Cell Group (MCG) or a Secondary Cell Group (SCG) may be referred to as a Special Cell (SpCell). A Primary Cell (PCell) may refer to the SpCell of an MCG. A Primary SCG Cell (PSCell) may refer to the SpCell of an SCG. MCG may refer to a group of serving cells associated with the Master Node (MN), including the SpCell and optionally one or more Secondary Cells (SCells). An SCG may refer to a group of serving cells associated with the Secondary Node (SN), including the SpCell and optionally one or more SCells.

As discussed previously, the frame structure for NR is to support flexible configurations for accommodating various next-generation (e.g., 5G) communication requirements, such as eMBB, mMTC, and URLLC, while fulfilling high reliability, high data rate, and low latency requirements. The orthogonal frequency-division multiplexing (OFDM) technology, as agreed in the $3^{rd}$ Generation Partnership Project (3GPP), may serve as a baseline for an NR waveform. The scalable OFDM numerology, such as the adaptive sub-carrier spacing, the channel bandwidth, and the cyclic prefix (CP), may also be used. Additionally, two coding schemes are considered for NR: (1) low-density parity-check (LDPC) code and (2) polar code. The coding scheme adaption may be configured based on the channel conditions and/or the service applications.

Moreover, it is also considered that in a transmission time interval of a single NR frame, at least DL transmission data, a guard period, and UL transmission data should be included, where the respective portions of the DL transmission data, the guard period, and the UL transmission data should also be configurable, for example, based on the network dynamics of NR. Besides, an SL resource may also be provided in an NR frame to support ProSe services.

The 3rd Generation Partnership Project (3GPP) New Radio (NR) Release-15 (Rel-15) supports link recovery (e.g., Beam Failure Recovery (BFR)) for special cells (e.g., Primary Cell (PCell) and/or Primary Secondary Cell (PS-Cell)). In Release 16 (Rel-16), link recovery for Secondary Cells (SCells) was introduced as well. High-level wise, a process of link recovery may include the following stages: Beam Failure Detection (BFD), New Beam Identification (NBI), Beam Failure Recovery reQuest (BFRQ) transmission, and network response reception.

In the stage of BFD, a UE may detect a beam failure event of a BWP of a serving cell based on at least one BFD reference signal (RS) implicitly or explicitly configured by the network (e.g., BS).

In the stage of NBI, a UE may, based on a set of configured (NBI) RSs, identify an alternative beam for recovering a link where the beam failure event is detected.

In the stage of BFRQ transmission, a UE may deliver information needed for recovering the link. The BFRQ transmission may be a Physical Random Access Channel (PRACH)-based transmission for special cells or a Physical Uplink Shared Channel (PUSCH)-based transmission (carried in MAC CE(s)) for SCells.

In the stage of network response reception, a UE may receive a response for completing the link recovery from the network (e.g., BS). For special cells, the UE may monitor a PDCCH transmission on a dedicatedly configured search space to determine whether or not the BFRQ is successfully received by the network. For SCells, the UE may monitor a UL DCI (PDCCH) transmission which indicates a HARQ process ID that is the same as the HARQ process ID used for the BFRQ (PUSCH) transmission, but with a toggled New Data Indicator (NDI) field.

In Release 17 (Rel-17), a multi-TRP scenario may be extended for a DL control channel (e.g., PDCCH). Details on how to derive BFD RS implicitly need to be devised.

In NR Rel-15/16, a Quasi-Colocated (QCL) assumption for a transmission is indicated via a Transmission Configuration indication (TCI) state. For a PDCCH reception, a CORESET may be configured with a set of candidate TCI states by Radio Resource Control (RRC) signaling, with a number constraint (e.g., maxNrofTCI-StatesPDCCH). Among the set of candidate TCI states, a TCI state may be activated, by a MAC CE(s), for monitoring the CORESET. As used herein, "monitoring a CORESET" may refer to monitoring a PDCCH(s) whose physical resource(s) is determined by a configuration of the CORESET. The MAC CE for activating the TCI state may be with a fixed size of 16 bits, as illustrated in FIG. 1.

FIG. 1 illustrates a MAC CE format 100 according to an implementation of the present disclosure. The notation "Oct" may refer to an octet, which is a unit of digital information that consists of eight bits. As illustrates in FIG. 1, the MAC CE format 100 has a fixed size of 16 bits, which consists of two octets: Oct 1 and Oct 2. The MAC CE format 100 includes the following fields:

Serving Cell ID: This field indicates the identity (ID) of the serving cell for which the MAC CE applies. The length of the field may be 5 bits;

CORESET ID: This field indicates a CORESET identified with the parameter ControlResourceSetId, as specified in, e.g., 3GPP Technical Specification (TS) 38.331 V15.8.0, for which the TCI state is indicated in the MAC CE format 100. If the value of this field is 0, a CORESET configured by the parameter controlResourceSetZero, as specified in, e.g., 3GPP TS 38.331 V15.8.0, may be indicated. The length of the field CORESET ID may be 4 bits; and TCI State ID: This field indicates the TCI state, as identified by the parameter TCI-StateId specified in, e.g., 3GPP TS 38.331 V15.8.0, applicable to the CORESET identified by the field of CORESET ID. If the field of CORESET ID is set to 0, the field of TCI State ID may refer to a TCI-StateId that indicates a TCI state of the first 64 TCI-states from a TCI-state-pool configured for a PDSCH channel in the active BWP. The TCI-state pool may be maintained by adding/modifying or releasing TCI states via, e.g., tci-States-ToAddModList and/or tci-States-ToReleaseList in the PDSCH configuration (e.g., PDSCH-Config) in the active BWP. If the field of CORESET ID is set to a value other than 0, the field of TCI State ID may refer to a TCI-StateId from another TCI-state-pool configured for a PDCCH channel in the active BWP. The TCI-state-pool for the PDCCH channel may be maintained by adding/modifying or releasing TCI states via, e.g., tci-StatesPDCCH-ToAddList and/or tci-StatesPDCCH-ToReleaseList in the parameter controlResourceSet identified by the CORESET ID indicated in the MAC CE format 100. The length of the field of TCI State ID may be 7 bits.

In Rel-15/16, a BFD RS, which is used for detecting a beam failure event/condition, may be either explicitly configured or implicitly configured. The explicit configuration of BFD RS(s) may be provided by explicit signaling (e.g., RRC signaling) from the network.

The implicit configuration of BFD RS(s) may take place when BFD RS(s) is not explicitly configured. Thus, it is in the sense of implicit configuration that term "implicit" is used herein. For the implicit configuration, the UE may determine the BFD RS(s) by including the RS(s) in the RS set(s) indicated by the TCI state(s) for the respective CORESET(s) that the UE uses for monitoring PDCCH. If there are two RS indexes configured for a TCI state, the RS with the QCL-TypeD configuration for the corresponding TCI state is included. For example, up to 2 BFD RSs may be explicitly configured for a BWP. In Rel-15, up to 3 CORESETs per BWP may be configured. In Rel-16, up to 5 CORESETs per BWP may be configured for multi-PDCCH-based multi-TRP transmission. For BFD RS selection for the implicit configuration, there may be no specified rule for selecting BFD RS(s) when the number (e.g., 3) of PDCCH TCI states (each TCI state corresponding to a CORESET within a concerned BWP) is larger than the number (e.g., 2) of BFD RS to be selected.

The above description related to the implicit configuration of BFD RS(s) may be applicable to beam failure recovery for either special cell(s) or for SCell(s).

Radio Link Monitoring (RLM) RS(s) may be determined implicitly as well, when the RLM RS(s) is not explicitly configured. For the implicit configuration of RLM RS(s), the UE may on its own select the RLM RS(s) based on the PDCCH reception TCI states. When there are more PDCCH TCI states than the number of RLM RS to be selected, the following rules (1) and (2) for selecting the RLM RS(s) may be applied:
  (1) The UE selects the required number of RSs provided for the activated TCI states (or "active TCI states") for PDCCH receptions in the CORESETs associated with the search space sets in an order from the shortest monitoring periodicity. As used herein, a (activated/active) TCI state for PDCCH reception(s) may refer to a (activated/active) TCI state that the UE applies to monitor a PDCCH.
  (2) If multiple CORESETs are associated with the search space sets having the same monitoring periodicity, the UE determines the order of the CORESETs from the highest CORESET index as described in, for example, 3GPP TS 38.213 V16.0.0.

If the active TCI state for PDCCH reception is associated with two RSs, the UE may expect that one RS has QCL-TypeD and the UE may use this RS (with QCL-TypeD) for radio link monitoring.

In Rel-16, multi-TRP techniques are applied for PDSCH for improved reliability and robustness targeted at fulfilling URLLC requirements. As one of multi-TRP features, a code point in a "Transmission Configuration Indication (TCI)" field in a Downlink (DL) Control Information (DCI) format may indicate up to 2 TCI states for PDSCH scheduling, as illustrated in FIG. 2.

Figure 2:
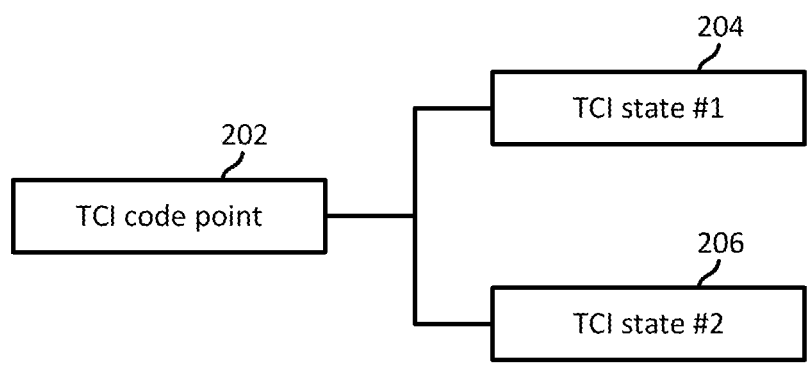
FIG. 2 illustrates a TCI code point that is associated with two TCI states according to an implementation of the present disclosure.

FIG. 2 illustrates a TCI code point 202 that is associated with two TCI states (TCI state #1 204 and TCI state #2 206) according to an implementation of the present disclosure. As used herein, a TCI code point may be a bit stream carried in a DCI field "TCI." The bit stream carried in the DCI field "TCI" may correspond to different values, thus different code points. Each TCI code point may be associated with one or multiple TCI states based on signaling from the BS. As illustrated in FIG. 2, the TCI code point 202 is associated with the TCI state #1 204 and the TCI state #2 206.

When one TCI code point is associated with two TCI states, the QCL assumptions indicated by both TCI states may be applied for PDSCH reception from the UE's perspective. The association between the TCI code point and the TCI states may be signaled by MAC CE signaling.

For PDCCH reliability and robustness, PDCCH transmission may adopt a similar Spatial Division Multiplexing (SDM) approach. That is, a UE may receive DCI by applying multiple QCL assumptions. In view of this, there may be a need to provide details on the following processes:
  a process of indicating to a UE multiple TCI states for a CORESET for PDCCH monitoring; and
  a process of selecting BFR RS(s). Specifically, for implicit configuration of BFD RS(s), QCL assumptions from the activated TCI state(s) for PDCCH monitoring may be used. As there are now more QCL-TypeD RS from activated TCI state(s) for PDCCH, a clear rule for selecting BFD RS(s) may be needed.

Indication of Multiple TCI States for a CORESET

For indicating to a UE multiple active TCI states for a CORESET, MAC CE signaling or RRC signaling may be used. As used herein, the term "active/activated TCI state for a CORESET" may refer to a TCI state that is activated by the network and is to be applied by the UE to monitor a CORESET. The indication of multiple TCI states for a CORESET may be implemented by a fixed-sized MAC CE, a variable-sized MAC CE, or an RRC configuration.

MAC CE with Fixed Size

A new MAC CE format, which may be identified by a unique Logical Channel Identifier (LCID), containing a fixed number (e.g., 2) of TCI state IDs may be introduced for indicating multiple active TCI states for a CORESET. The indicated active TCI states may be constrained within the RRC-configured TCI states for PDCCH monitoring. In another example, the indicated active TCI states may be constrained within a subset of the RRC-configured TCI states for PDSCH monitoring.

The indicated active TCI states may be associated with different TRPs. For example, each of the indicated active TCI states may be associated with a TCI state group ID. When two TCI states are activated for the UE to monitor a CORESET, the two active TCI states may not associate with a same group ID, as illustrated in FIG. 3.

Figure 3:
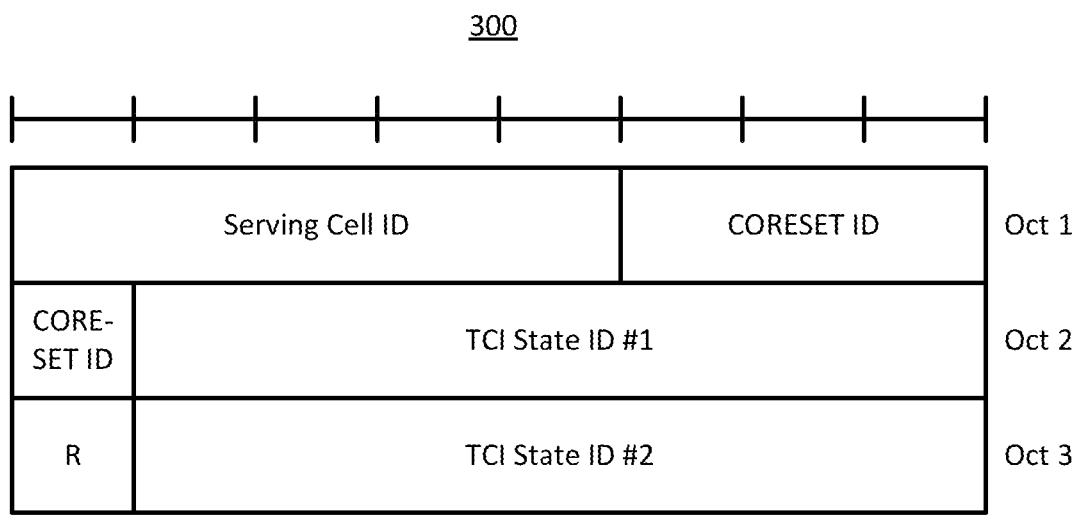
FIG. 3 illustrates a MAC CE format with a fixed size for indicating two TCI states according to an implementation of the present disclosure.

FIG. 3 illustrates a MAC CE format 300 with a fixed size for indicating two TCI states according to an implementation of the present disclosure. The MAC CE format 300 includes the following fields:

Serving Cell ID: This field indicates the ID of the serving cell for which the MAC CE applies. The length of the field may be 5 bits;

CORESET ID: This field indicates a CORESET identified with ControlResourceSetId, as specified in, e.g., 3GPP TS 38.331 V15.8.0, for which the TCI state is in the MAC CE format 300. If the value of the field is 0, a CORESET configured by the parameter controlResourceSetZero, as specified in, e.g., 3GPP TS 38.331 V15.8.0, may be indicated. The length of the field CORESET ID may be 4 bits;

TCI State ID #1: This field indicates the 1st TCI state, as identified by the parameter TCI-StateId specified in, e.g., 3GPP TS 38.331 V15.8.0, applicable to the CORESET identified by the field of CORESET ID. If the field of CORESET ID is set to 0, the field of TCI State ID #1 may refer to a TCI-StateId that indicates a TCI state of the first 64 TCI-states from a TCI-state-pool configured for a PDSCH channel in the active BWP. The TCI-state pool may be maintained by adding/modifying or releasing TCI states via, e.g., tci-States-ToAddModList and/or tci-States-ToReleaseList in the PDSCH configuration (e.g., PDSCH-Config) in the active BWP. If the field of CORESET ID is set to a value other than 0, the field of TCI State ID #1 may refer to a TCI-StateId from another TCI-state-pool configured for a PDCCH channel in the active BWP. The TCI-state-pool for the PDCCH channel may be maintained by adding/modifying or releasing TCI states via, e.g., tci-StatesPDCCH-ToAddList and/or tci-StatesPDCCH-ToReleaseList in the parameter controlResourceSet identified by the CORESET ID indicated in the MAC CE format 300. The length of the field of TCI State ID #1 may be 7 bits;

TCI State ID #2: This field indicates the $2^{nd}$ TCI state, as identified by TCI-StateId specified in, e.g., TS 38.331 V15.8.0, applicable to the CORESET identified by the field of CORESET ID. If the field of CORESET ID is set to 0, the field of TCI State ID #2 may refer to a TCI-StateId that indicates a TCI state of the first 64 TCI-states from a TCI-state-pool configured for a PDSCH channel in the active BWP. The TCI-state pool may be maintained by adding/modifying or releasing TCI states via, e.g., tci-States-ToAddModList and/or tci-States-ToReleaseList in the PDSCH configuration (e.g., PDSCH-Config) in the active BWP. If the field of CORESET ID is set to a value other than 0, the field of TCI State ID #2 may refer to a TCI-StateId from another TCI-state-pool configured for a PDCCH channel in the active BWP. The TCI-state-pool for the PDCCH channel may be maintained by adding/modifying or releasing TCI states via, e.g., tci-StatesPDCCH-ToAddList and/or tci-StatesPDCCH-ToReleaseList in the parameter controlResourceSet identified by the CORESET ID indicated in the MAC CE format 300. The length of the field of TCI State ID #2 may be 7 bits; and R: reserved bit.

Figure 4:
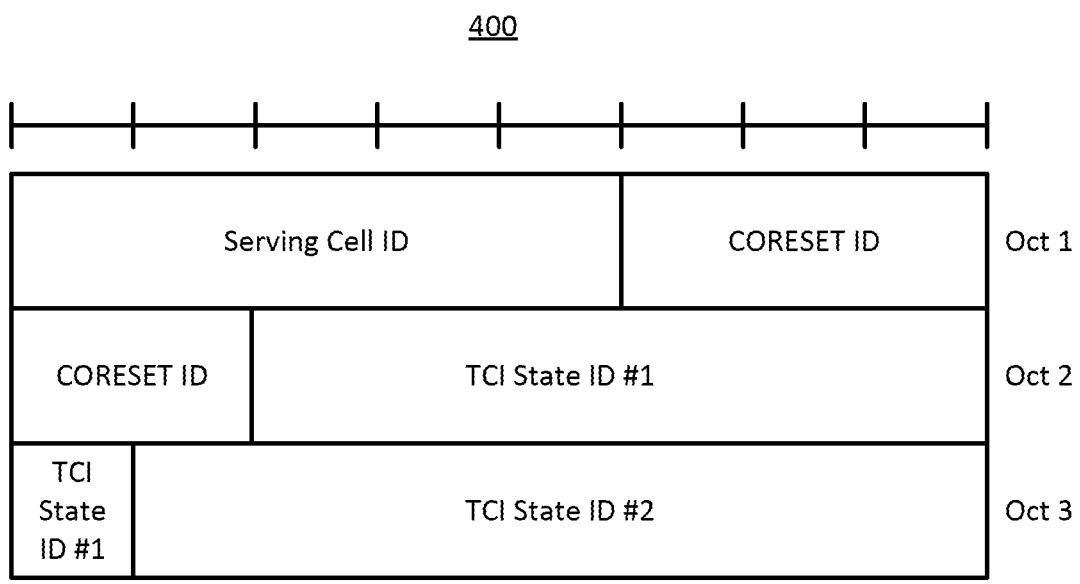
FIG. 4 illustrates a MAC CE format with a fixed size for indicating two TCI states according to another implementation of the present disclosure.

FIG. 4 illustrates a MAC CE format 400 with a fixed size for indicating two TCI states according to another implementation of the present disclosure. Compared with FIG. 3, the "CORESET ID" field length is 1 bit longer to take into account larger number of supported CORESETs in a multi-TRP scenario (e.g., the CORESET ID in the MAC CE format 400 is a 5-bit field). It is noted that in the multi-TRP scenario, the number of CORESETs in one PDCCH-configuration can be up to 5 per NR Rel-16 specifications. With up to 4 DL BWPs per serving cell, a 4-bit field as CORESET ID may not be enough.

MAC CE with Variable Size

A new MAC CE format, which may be identified by a unique LCID, containing a variable number of TCI state IDs may be introduced for indicating active TCI states for a CORESET. The MAC CE supports indication of at least two TCI states. The indicated TCI states may be constrained within the RRC-configured TCI states for PDCCH monitoring. In another example, the indicated TCI states may be constrained within a subset of the RRC-configured TCI states for PDSCH monitoring. The indicated TCI states may be constrained to be associated with different TRPs. For example, each TCI state may be associated with a TCI state group ID. When two TCI states are indicated for a CORESET, the two TCI states may not associate with a same TCI state group ID.

Figure 5:
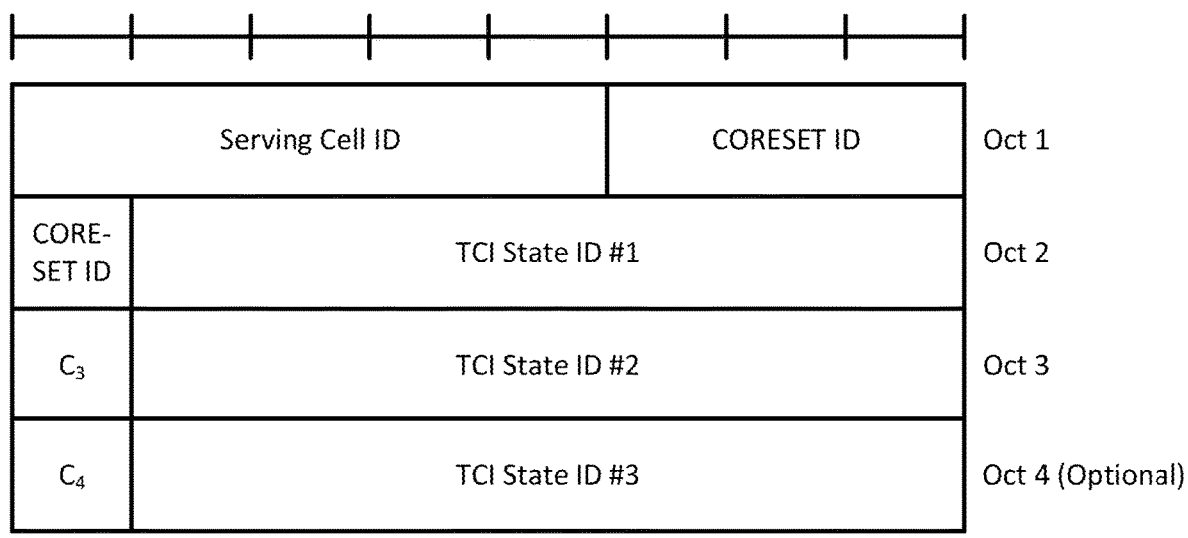
FIG. 5 illustrates a MAC CE format with a variable size for indicating at least two TCI states according to an implementation of the present disclosure.

FIG. 5 illustrates a MAC CE format 500 with a variable size for indicating at least two TCI states according to an implementation of the present disclosure. The MAC CE format 500 may include the following fields:

Serving Cell ID: This field indicates the ID of the serving cell for which the MAC CE applies. The length of the field may be 5 bits;

CORESET ID: This field indicates a CORESET identified with ControlResourceSetId, as specified in, e.g., 3GPP TS 38.331 V15.8.0, for which the TCI state is in the MAC CE format 300. If the value of the field is 0, a CORESET configured by the parameter controlResourceSetZero, as specified in, e.g., 3GPP TS 38.331 V15.8.0, may be indicated. The length of the field CORESET ID may be 4 bits;

TCI State ID: This field indicates the TCI state, as identified by the parameter TCI-StateId specified in, e.g., 3GPP TS 38.331 V15.8.0, applicable to the CORESET identified by the field of CORESET ID. If the field of CORESET ID is set to 0, the field of TCI State ID may refer to a TCI-StateId that indicates a TCI state of the first 64 TCI-states from a TCI-state-pool configured for a PDSCH channel in the active BWP. The TCI-state pool may be maintained by adding/modifying or releasing TCI states via, e.g., tci-States-ToAddModList and/or tci-States-ToReleaseList in the PDSCH configuration (e.g., PDSCH-Config) in the active BWP. If the field of CORESET ID is set to a value other than 0, the field of TCI State ID may refer to a TCI-StateId from another TCI-state-pool configured for a PDCCH channel in the active BWP. The TCI-state-pool for the PDCCH channel may be maintained by adding/modifying or releasing TCI states via, e.g., tci-StatesPDCCH-ToAddList and/or tci-StatesPDCCH-ToReleaseList in the parameter controlResourceSet identified by the CORESET ID indicated in the MAC CE format 500. The length of the field of TCI State ID may be 7 bits;

TCI State ID #i (i≥2): This field indicates the $i^{th}$ TCI state identified by the parameter TCI-StateId, as specified in e.g., TS 38.331 V15.8.0, applicable to the CORESET identified by the field of CORESET ID. If the field of CORESET ID is set to 0, the field of TCI State ID #i indicates a TCI-StateId for a TCI state of the first 64 TCI-states from a TCI-state-pool configured for a PDSCH channel in the active BWP. The TCI-state pool may be maintained by adding/modifying or releasing TCI states via e.g., tci-States-ToAddModList and/or tci-States-ToReleaseList in the PDSCH configuration (e.g., PDSCH-Config) in the active BWP. If the field of CORESET ID is set to the other value than 0, the field of TCI State ID #i may refer to a TCI-StateId from another TCI-state-pool configured for a PDCCH channel in the active BWP. The TCI-state-pool for the PDCCH channel may be maintained by adding/modifying or releasing TCI states via e.g., tci-StatesPDCCH-ToAddList and/or tci-StatesPDCCH-ToReleaseList in the parameter controlResourceSet identified by the CORESET ID indicated in the MAC CE format 500. The length of the field of TCI State ID #i may be 7 bits;

$C_{i+1}$ (i≥2): This field indicates the existence of a next octet (or "byte") which provides indication to TCI State ID #(i+1). For example, the value of $C_{i+1}$ may be set to "1" to indicate that the next octet is present in the MAC CE format 500 and may be set to "0" to indicate not present. As illustrated in FIG. 5, the field of $C_3$ in Oct 3 of the MAC CE format 500 is used to indicate whether the next octet (e.g., Oct 4) to Oct 3 is included in the MAC CE format 500; the field of $C_4$ in Oct 4 of the MAC CE format 500 is used to indicate whether the next octet (e.g., Oct 5, not illustrated in FIG. 5) to Oct 4 is included in the MAC CE format 500 Thus, the actual size of the MAC CE format 500 is determined by the value of the $C_{i+1}$ field, and it is in the sense of "a MAC CE format with a variable size" that the term "variable" is used herein.

The field of CORESET ID may be extended to 5 bits. To accommodate the additional one bit of the CORESET ID field compared with FIG. 5, one additional octet may be introduced, and the redundant bit(s) may be reserved, as illustrated in FIG. 6.

Figure 6:
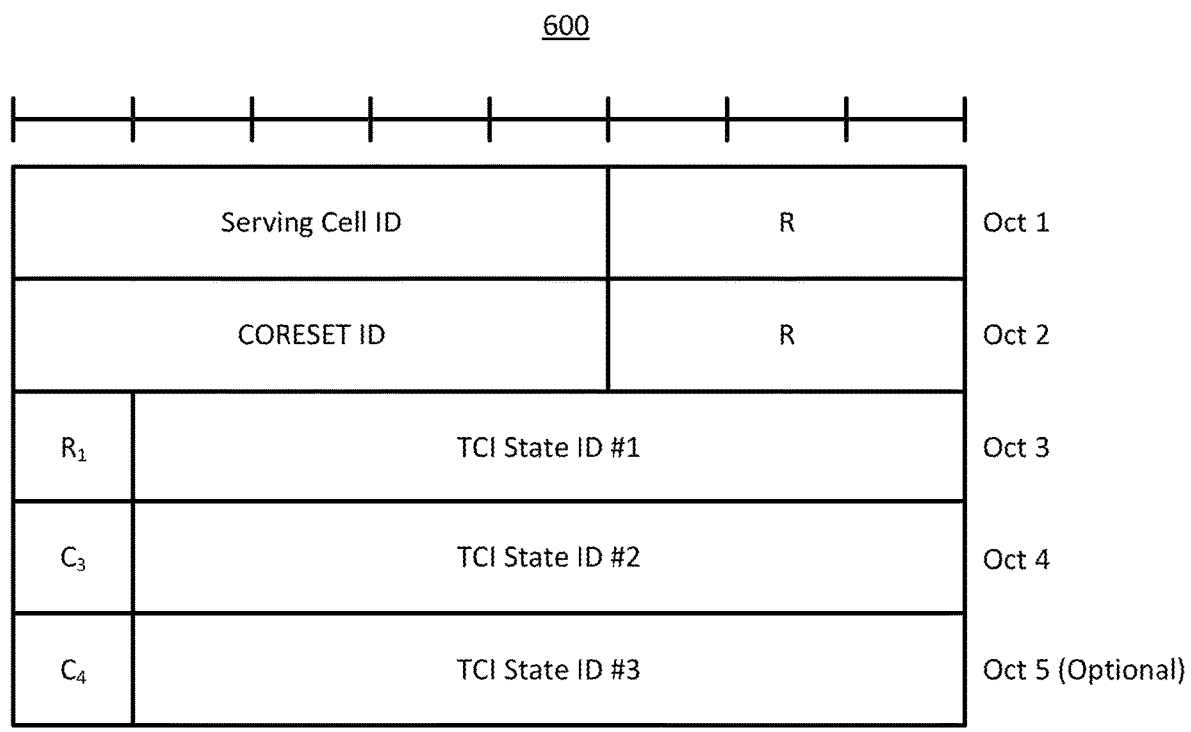
FIG. 6 illustrates a MAC CE format with a variable size for indicating at least two TCI states according to another implementation of the present disclosure.

FIG. 6 illustrates a MAC CE format 600 with a variable size for indicating at least two TCI states according to another implementation of the present disclosure. It is noted that the position(s) of the 7 reserved bits (e.g., R fields) is for illustration only. They may be arranged in other position(s) as well. The 1-bit R field "$R_1$" in FIG. 6 may be interpreted as a field of "$C_2$" in another implementation for indicating the presence of TCI State ID #2 field. For example, when $R_1=C_2=0$, it means that the octets (e.g., Oct 4 and Oct 5) after Oct 3 are not present in the MAC CE format 600.

RRC-based Approach

If the MAC CE for indicating TCI state remains unchanged, as specified in legacy Rel-15/16, additional set(s) of TCI states may be added into a CORESET configuration, resulting in multiple sets of TCI states in a CORESET (RRC) configuration. As used herein, the MAC CE specified in legacy Rel-15/16 may refer to a MAC CE which indicates only one TCI state for monitoring an indicated CORESET. The MAC CE may have a fixed size of 16 bits.

When receiving the MAC CE, the activation/deactivation indication provided by the MAC CE may apply to all sets of TCI states of the indicated CORESET. In one example, the TCI State ID may be indicated by the MAC CE directly. In one example, the TCI state indication field(s) in the MAC CE may not correspond to the TCI State ID as configured in the CORESET (RRC) configuration directly. Instead, for a CORESET with multiple sets of TCI states, the TCI state indication field(s) may indicate the ordinal position of each TCI-state set. For example, there may be a 1-bit field for each TCI state configured by CORESET configuration, for indicating whether or not the corresponding TCI state is activated or deactivated. When the $i^{th}$ field is set to 1, the TCI states with ordinal position i in each set may be activated and mapped to a same codepoint of a DCI TCI field. In another example, the number of entries of individual sets in a CORESET may be the same. The $i^{th}$ field in the MAC CE (e.g., described in TS 38.321 V15.8.0) may correspond to the entry index of each TCI-state set. When $i^{th}$ field is set to 1, the TCI states with entry index i in each set is activated and is mapped to a same codepoint of a DCI Transmission Configuration Indication (TCI) field. In one example, not all entries are provided with corresponding TCI states. Thus, the number of activated TCI states associated with a codepoint of a DCI TCI field may be less than the number of TCI-state sets.

The tci-StatesPDCCH-ToAddList in the ControlResourceSet may have two lists. The RRC configuration of the ControlResourceSet may be described as structured information by Abstract Syntax Notation One (ASN.1) in Table 1.

As illustrated in Table 1, the ControlResourceSet may include tci-StatesPDCCH-ToAddList0 (or "list 0") and tci-StatesPDCCH-ToAddList1 (or "list 1"), and TCI states in list 0 and list 1 may be different.

TABLE 1

```
ControlResourceSet ::=        SEQUENCE {
    ...
    tci-StatesPDCCH-ToAddList0    SEQUENCE (SIZE (1.. maxNrofTCI-StatesPDCCH)) OF TCI-StateId
    OPTIONAL,
    -- Cond NotSIB1-initialBWP
    tci-StatesPDCCH-ToAddList1    SEQUENCE (SIZE (1.. maxNrofTCI-StatesPDCCH)) OF TCI-StateId
    OPTIONAL,
    -- Cond NotSIB1-initialBWP
    tci-StatesPDCCH-ToReleaseList    SEQUENCE (SIZE (1.. maxNrofTCI-StatesPDCCH)) OF TCI-StateId
    OPTIONAL,
    -- Cond NotSIB1-initialBWP
    tci-PresentInDCI              ENUMERATED {enabled}
    OPTIONAL,
    -- Need S
    pdcch-DMRS-ScramblingID       INTEGER (0 .. 65535)
    OPTIONAL,
    -- Need S
    ...
}
-- TAG-CONTROLRESOURCESET-STO
-- ASN1STOP
```

A TCI state ID in a MAC CE may correspond to the ordinal position of the TCI state ID in the list. Thus, when MAC CE indicates the activated TCI states, the associated TCI states in the two lists (e.g., the tci-StatesPDCCH-ToAddList0 and the tci-StatesPDCCH-ToAddList1 illustrated in Table 1) may be activated simultaneously. For example, assuming that the TCI state IDs in each list are sorted in a descending/ascending order according to their values, the $i^{th}$ TCI state ID in each list (e.g., the tci-StatesPDCCH-ToAddList0 and the tci-StatesPDCCH-ToAddList1) may be activated by the MAC CE simultaneously for the CORESET. Different lists may correspond to different TRPs.

BFD RS Selection for Implicit Configuration

As described previously, for multi-TRP-based PDDCH reliability enhancement, a PDCCH may be monitored with multiple QCL assumptions where each QCL assumption may be indicated by a respective TCI state. For beam failure detection purposes, the number of BFD RSs may be upper limited, e.g., 2 BFD RSs per BWP, and the number of BFD RSs may be smaller than the total number of TCI states for PDCCH monitoring over all related CORESET(s). The related CORESETs may be the CORESETs configured for a concerned active BWP. When a BFD RS is to be determined implicitly from the PDCCH reception TCI states, down selection on the TCI states may be needed. For such down selection, the following may be assumed: when an active TCI state for PDCCH reception includes two RSs, the UE may assume that one RS has QCL-TypeD and the UE may use the QCL-TypeD RS as a BFD RS, if the active TCI state is selected for beam failure detection purposes.

For selecting a subset of RSs from PDCCH reception TCI states for beam failure detection purposes, one or a subset combination of the following rules (1) to (11) may be applied:

(1) Active TCI state(s) in CORESET(s) associated with the search space sets with shorter monitoring periodicity may be selected first.

(2) Active TCI state(s) in CORESET(s) associated with higher priority CORESET(s) may be selected first. The higher priority CORESETs may be based on a CORESET index. In one example, lower-indexed (or higher-indexed) CORESET(s) may have higher priority. In another example, CORESET priority is indicated by base station signaling.

(3) Active TCI state(s) in CORESET(s) with higher or lower CORESET group ID (e.g., CORESETPoolIndex) may be selected first. In one example, a master CORESET group may be identified by, e.g., CORESET group ID, and active TCI state(s) associated with the master CORESET group may be selected first.

(4) If there are multiple active TCI states in a CORESET, a default TCI state from the multiple active TCI states may be selected. The default one may be preconfigured, or RRC configured, or pre-defined, or specified in the specifications. For example, the default one may be
the first (or last) one among the multiple active TCI states;
the one with the lowest (or highest) TCI-StateId among the multiple active TCI states; or
a TCI state may be associated with a TCI state group index. The default one may be the TCI state associated with a lowest (or highest) TCI state group index. In one example, each of the multiple active TCI states in the CORESET may be associated with different TCI state group indexes.

(5) A TCI state may be associated with a TCI state group index. PDCCH reception TCI state(s) associated with a lower (or higher) TCI state group index may be selected first. In one implementation, each of the multiple active TCI states in a CORESET may be associated with different TCI state group indexes.

(6) An active TCI state whose QCL RS(s) corresponds to lower-indexed (or higher-indexed) serving cell(s) may be selected first.

(7) An active TCI state whose QCL RS(s) corresponds to an intra-band serving cell of the concerned serving cell may be selected first.
The concerned serving cell may be the serving cell where beam failure detection is targeted for, based on the selected BFD RS.

(8) An active TCI state with lower (or higher) TCI state ID (e.g., TCI-StateId) may be selected first.

(9) An active TCI state with shorter QCL RS(s) periodicity may be selected first.

(10) Active TCI states in CORESET(s) with multiple TCI states may be selected first (or last). For example, the priority (e.g., the first or last) may be configured by BS signaling. The priority may be "first" to benefit the multi-TRP case. The priority may be "last" to prioritize single-TRP operation.

(11) UE implementation.

It is noted that when a subset combination of the above rules is applied, it may be further subject to an order for applying the subset of rules. In the following, a few such examples are provided.

It is further noted that while the discussion here assumes implicit BFD RS selection, the same principle is applicable for enhancing implicit RLM RS selection.

Case #1: Two-Stage BFD RS Selection

In this case, for a CORESET with multiple active TCI states, one active TCI state is selected from the multiple active TCI states in Stage-1. In Stage-2, a required number of TCI states (which is equal to the number of BFD RS to be derived) is selected from the remaining active TCI states (individual remaining active TCI states correspond to individual CORESETs). Example details of the two-stage case are described below:

Stage-1: For a CORESET with multiple active TCI states, a UE may select one active TCI state for BFD RS purposes. A default TCI state from the multiple active TCI states may be selected. The default TCI state may be determined based on the rules described above in the section labeled "BFD RS Selection for Implicit Configuration". That is, the default one may be preconfigured, or RRC configured, or pre-defined, or specified in the 3GPP technical specifications. The default TCI state may be
the first (or last) TCI state among the multiple active TCI states;
the TCI state with lowest (or highest) TCI-StateId among the multiple active TCI states;
a TCI state associated with a CORESET pool index (e.g., CORESETPoolIndex) of the CORESET, where the CORESETPoolIndex may be used to identify a master CORESET, which may further correspond to a master TRP; or
a TCI state associated with a TCI state group index. The default TCI state may be the TCI state associated with a lowest (or highest) TCI state group index. Each of the multiple active TCI states in the CORESET may be associated with different TCI state group indexes.

In one example, the action of selecting one active TCI state from the multiple active TCI states may be performed for each CORESET configured with multiple active TCI states.

In another example, the action of selecting one active TCI state from the multiple active TCI states may not be performed on each CORESET configured with multiple active TCI states. Instead, the selection may be performed on CORESET(s) one-by-one if the total number of active TCI states is larger than the required number of BFD RS. When the remaining number of TCI states (including those from multiple-TCI-State CORESET(s) and from single-TCI-State CORESET(s)) is equal to or smaller than the required number of BFD RSs, the selection may not be performed to remaining multiple-TCI-State CORESET(s). Selection of multiple-TCI-State CORESET(s) for down-selecting corresponding multiple TCI states may follow at least one of the rules (1) to (11) described above in the section labeled "BFD RS Selection for Implicit Configuration." For example, the selection may be based on the CORESET index. The multiple-TCI-State CORESET with the highest CORESET index may be selected for down-selection first. As used herein, a "multiple-TCI-State CORESET" may refer to a CORESET for which multiple TCI states are indicated to be activated for monitoring the PDCCH(s). A "single-TCI-State CORESET" may refer to a CORESET for which only one TCI state is indicated to be activated for monitoring the PDCCH(s).

Stage-2: If the total number of active TCI states in related CORESET(s) is still larger than the number of required BFD RSs (e.g., the number may be 2), the UE may down-select the remaining TCI states to meet the required number of BFD RSs. That is, the UE may determine a subset of the remaining TCI states by performing the down-selection, where the total number of TCI states in the subset meets the required number of BFD RSs (e.g., 2).

In one example, the remaining TCI states may originally correspond to a multiple-TCI-State CORESET or correspond to a single-TCI-State CORESET.

In one example, the down-selection may be based on UE implementation.

In one example, the remaining TCI states that are originally corresponding to the multiple-TCI-State CORESET may be down-selected first. In another example, the remaining TCI states that are originally corresponding to the single-TCI-State CORESET may be down-selected first.

In one example, a UE may reuse the Rel-15 RLM RS selection rule to select the BFD RS(s) when deriving the BFD RS(s) from the TCI states for PDCCH reception.

In one example, the Rel-15 RLM RS selection rule, with an additional rule to prioritize a certain CORESET group index or TCI state group index, may be used for BFD RS derivation. For example, the UE may select the required number of RSs provided for active TCI states for PDCCH receptions in CORESETs associated with the search space sets in an order from the shortest monitoring periodicity. If more than one CORESET is associated with search space sets having the same monitoring periodicity, the UE may determine the order of the CORESETs (or TCI states) from, e.g., the highest CORESET group index (or TCI state group index). In one example, a master CORESET group may be identified by, e.g., CORESET group ID, and active TCI state(s) associated with the master CORESET group may be selected first. If more than one CORESET (or TCI state) is associated with the same CORESET group index (or TCI state group index), the UE may determine the order of the CORESETs (or TCI states) from, e.g., the highest CORESET index (or TCI state index).

Case #2: RLM-Based Rule

In this case, Rel-15 RLM RS selection rules may be used as the baseline when a UE derives BSD RS(s) from TCI states for PDCCH receptions. On top of the RLM RS selection, additional rules (e.g., rules (1) to (11)) provided in the section above labeled "BFD RS Selection for Implicit Configuration" may be applied to take into account the fact that a CORESET may be activated with multiple TCI states.

In one example, if more TCI states than needed remain after applying Rel-15 RLM rules, TCI states with lower (or higher) TCI state indexes are selected.

In one example, if more TCI states than needed remain after applying Rel-15 RLM rules, TCI states corresponding to an intra-band serving cell of the concerned serving cell may be selected first. The concerned serving cell may be the serving cell where beam failure detection is targeted for, based on the selected BFD RS. If still too many TCI states are present, TCI states with lower (or higher) TCI state indexes may be selected.

Case #3: Prioritizing CORESETs with Multiple TCI States

In this case, TCI states associated with CORESET(s) with multiple TCI states are selected with priority. If the resultant number of TCI states is larger than the required number, further rules (1) to (11) listed above in the section labeled "BFD RS Selection for Implicit Configuration" may be applied for down-selection. Alternatively, if the resultant number of TCI states is smaller than the required number, TCI states associated with 1-TCI-State CORESET(s) may be selected gradually also based on the rules (1) to (11) listed above in the section labeled "BFD RS Selection for Implicit Configuration," e.g., applying the Rel-15 RLM-related rules.

In Case #3, a UE may select TCI states associated with CORESET(s) with multiple TCI states. If the resultant number of TCI states is larger than the required number, a subset of the resultant TCI states above is excluded so that the remaining number of TCI states meets the requirement. The exclusion principle may be based on UE implementation or the rules (1) to (11) described above in the section labeled "BFD RS Selection for Implicit Configuration."

If the result number of TCI states is smaller than the required number, additional TCI state(s) associated with the single-TCI-State-CORESET may be selected until a total number of selected TCI states meets the requirement.

In one example, the selection may be based on UE implementation.

In one example, the selection may be based on the Rel-15 RLM selection rule(s).

Case #4: Prioritizing CORESET(s) with 1 TCI State

In this case, TCI states associated with CORESET(s) with 1 TCI state are selected with priority. If the resultant number of TCI states is larger than the required number, further rules (1) to (11) listed above in the section labeled "BFD RS Selection for Implicit Configuration" may be applied for down-selection. Alternatively, if the resultant number of TCI states is smaller than the required number, TCI states associated with multiple-TCI-State CORESET(s) may be selected gradually based on the rules (1) to (11) listed above in the section labeled "BFD RS Selection for Implicit Configuration" until the total number of TCI states meets a required number.

In Case #4, a UE may select TCI states associated with CORESET(s) with 1 TCI state. If the resultant number of TCI states is larger than the required number, a subset of the resultant TCI states above is excluded so that the remaining number of TCI states meets a required number. The exclusion principle may be based on UE implementation or the Rel-15 RLM selection rule(s).

If the resulting number of TCI states is smaller than the required number, additional TCI state(s) associated with CORESET(s) with multiple TCI states is selected until a total number of selected TCI states meets the requirement. The selection may be UE implementation or based on the RLM-based rule(s) described in Case #2.

Example Method for BFD RS Determination/Selection

Figure 7:
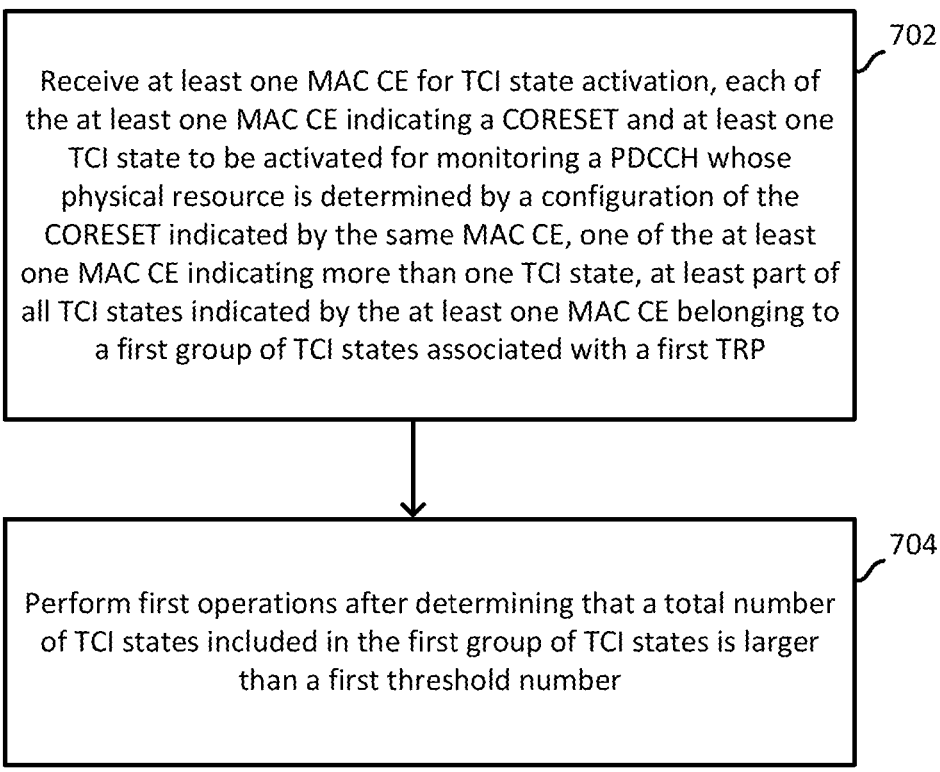
FIG. 7 illustrates a flowchart of a method performed by a UE configured with more than one TRP in an active BWP for BFD RS determination according to an implementation of the present disclosure.

FIG. 7 illustrates a flowchart of a method performed by a UE configured with more than one TRP in an active BWP for BFD RS determination according to an implementation of the present disclosure. Although actions 702 and 704 are illustrated as separate actions represented as independent blocks in FIG. 7, these separately illustrated actions should not be construed as necessarily order-dependent. The order in which the actions are performed in FIG. 7 is not intended to be construed as a limitation, and any number of the disclosed blocks may be combined in any order to implement the method, or an alternate method. Moreover, each of actions 702 and 704 may be performed independent of other actions, and can be omitted in some implementations of the present disclosure.

In action 702, a UE may receive at least one MAC CE for TCI state activation. Each of the at least one MAC CE may indicate a CORESET and at least one TCI state to be activated for monitoring a PDCCH whose physical resource is determined by a configuration of the CORESET indicated by the same MAC CE. One of the at least one MAC CE may indicate more than one TCI state. At least part of all TCI states indicated by the at least one MAC CE may belong to a first group of TCI states associated with a first TRP.

In action 704, the UE may perform first operations after determining that a total number of TCI states included in the first group of TCI states is larger than a first threshold number.

Figure 8:
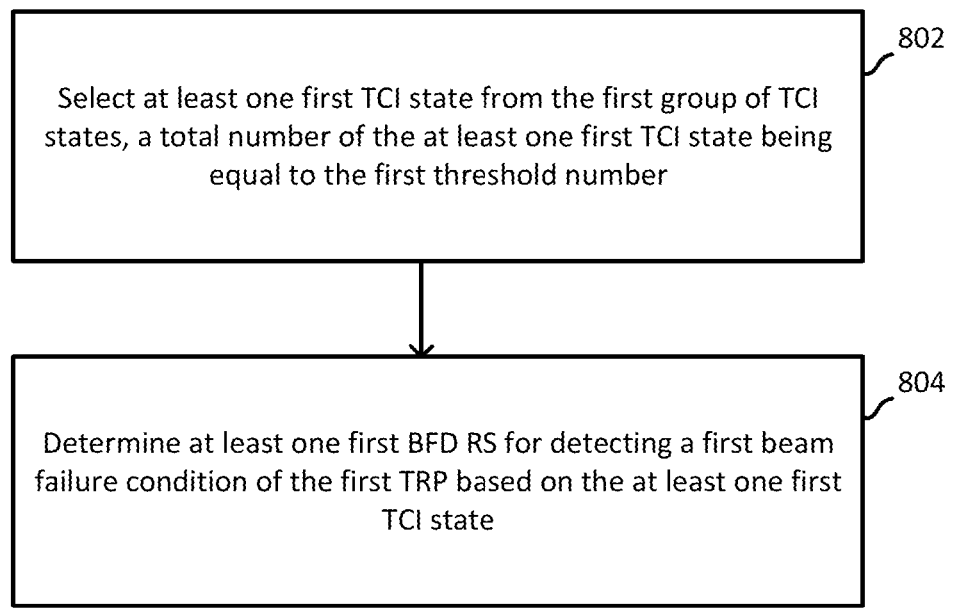
FIG. 8 illustrates a flowchart for the first operations of FIG. 7 according to an implementation of the present disclosure.

FIG. 8 illustrates a flowchart of the first operations of FIG. 7 according to an implementation of the present disclosure. As illustrated in FIG. 8, the first operations include actions 802 and 804.

In action 802, the UE may select at least one first TCI state from the first group of TCI states, where the total number of the at least one first TCI state is equal to the first threshold number. In action 804, the UE may determine at least one first BFD RS for detecting a first beam failure condition of the first TRP based on the at least one first TCI state.

In one example, in the first group of TCI states, a TCI state that is associated with a CORESET having a lowest monitoring periodicity among all CORESETs associated with the first group of TCI states may be prioritized to be selected as one of the at least one first TCI state.

In one example, in the first group of TCI states, a TCI state that is associated with a CORESET indicated by the one of the at least one MAC CE (e.g., the MAC CE indicating more than one TCI state) may be prioritized to be selected as one of the at least one first TCI state. If the one of the at least one MAC CE includes a plurality of TCI state IDs, one of the plurality of TCI state IDs may indicate the TCI state that is prioritized to be selected as the one of the at least one first TCI state, where the Most Significant Bit (MSB) of the TCI state ID may be closest, among all MSBs of the plurality of TCI state IDs included in the one of the at least one MAC CE, to an MSB of a bit string represented by the one of the at least one MAC CE. Taking FIG. 3 as an example, the MAC CE (or MAC CE format 300) includes TCI State ID #1 and TCI State ID #2. Compared with the MSB of TCI State ID #2, the MSB of TCI State ID #1 is closer to the MSB of the bit string represented by the MAC CE (e.g., the MSB in Oct 1 of the MAC CE format 300). Therefore, the TCI state indicated by TCI State ID #1 may be prioritized to be selected as one of the first TCI state(s). That is, compared with the TCI state indicated by TCI State ID #2, the UE may first select the TCI state indicated by TCI State ID #1 as a first TCI state for determining first BFD RS(s).

The method illustrated in FIGS. 7 and 8 may be performed based on a per-TRP basis. For example, if at least another part of the TCI states indicated by the at least one MAC CE belongs to a second group of TCI states associated with a second TRP, the UE may also perform second operations after determining that a total number of TCI states included in the second group of TCI states is larger than a second threshold number. The second operations may include selecting at least one second TCI state from the second group of TCI states (the total number of the at least one second TCI state is equal to the second threshold number), and determining at least one second BFD RS for detecting a second beam failure condition of the second TRP based on the at least one second TCI state.

In one implementation, the one of the at least one MAC CE (e.g., the MAC CE indicating more than one TCI state, as described in action 702 of FIG. 7) may include two TCI states associated with different TRPs. For example, the MAC CE may include a serving cell ID, a CORESET ID, a first TCI state ID, and a second TCI state ID, where the first TCI state ID indicates a TCI state belonging to the first group of TCI states, and the second TCI state ID indicates a TCI state belonging to the second group of TCI states.

In one implementation, the one of the at least one MAC CE (e.g., the MAC CE indicating more than one TCI state, as described in action 702 of FIG. 7) may have a fixed-sized format for indicating two TCI states for PDCCH monitoring. As illustrated in FIG. 3 or 4, only two TCI states may be indicated by the MAC CE having the fixed-sized format.

In one implementation, the one of the at least one MAC CE (e.g., the MAC CE indicating more than one TCI state, as described in action 702 of FIG. 7) may have a variable-sized format for indicating at least two TCI states for PDCCH monitoring. As illustrated in FIG. 5 or 6, two or more than two TCI states may be indicated by the MAC CE having the variable-sized format. For example, the variable-sized format may be implemented by including an indicator (e.g., the field $C_i$ illustrated in FIG. 5 or 6) in the MAC CE, where the indicator may be used for indicating existence of an octet which includes a third TCI state ID.

Figure 9:
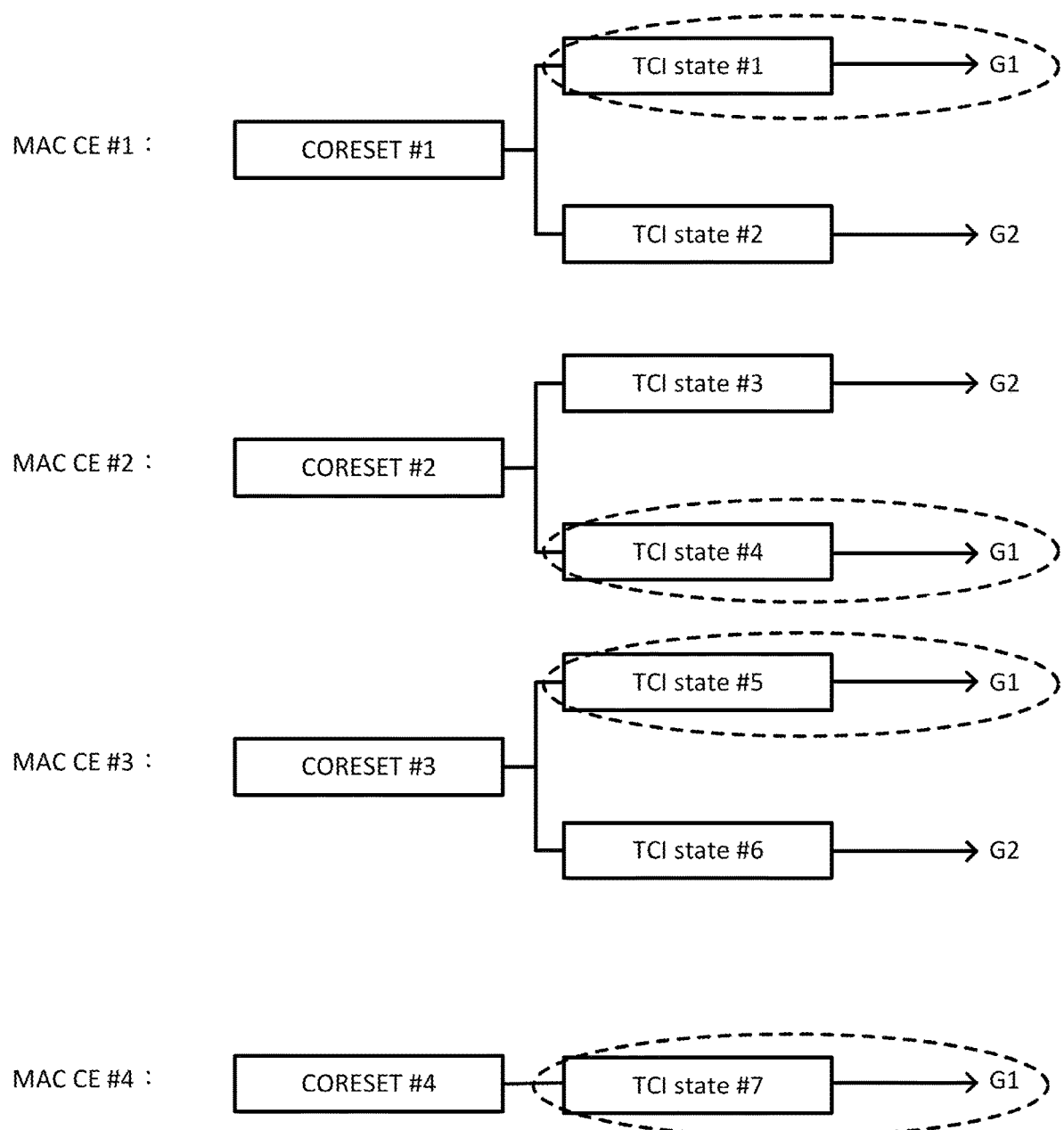
FIG. 9 illustrates a process of BFD RS determination according to an implementation of the present disclosure.

FIG. 9 illustrates a process of BFD RS determination according to an implementation of the present disclosure. In the illustrated process, the UE receives four MAC CEs for TCI state activation: MAC CE #1, MAC CE #2, MAC CE #3 and MAC CE #4. MAC CE #1 indicates CORESET #1 and two TCI states (e.g., TCI state #1 and TCI state #2) to be activated for monitoring the PDCCH(s) whose physical resource is determined by the configuration of CORESET #1. MAC CE #2 indicates CORESET #2 and two TCI states (e.g., TCI state #3 and TCI state #4) to be activated for monitoring the PDCCH(s) whose physical resource is determined by the configuration of CORESET #2. MAC CE #3 indicates CORESET #3 and two TCI states (e.g., TCI state #5 and TCI state #6) to be activated for monitoring the PDCCH(s) whose physical resource is determined by a configuration of CORESET #3. MAC CE #4 indicates CORESET #4 and one TCI state (e.g., TCI state #7) to be activated for monitoring the PDCCH(s) whose physical resource is determined by the configuration of CORESET #4. Each of the received MAC CEs may have a fixed-sized format (e.g., as illustrated in FIG. 1, 3, or 4) or a variable-sized format (e.g., as illustrated in FIG. 5 or 6).

Among the TCI states (e.g., TCI states #1 to #7) indicated by the received MAC CEs, TCI states #1, #4, #5 and #7 belong to a first group G1 of TCI states, and TCI states #2, #3 and #6 belong to a second group G2 of TCI states. The first group G1 may be associated with a first TRP. The second group G2 may be associated with a second TRP.

Since the total number of TCI states included in the first group G1 is "four," which is larger than a first threshold number (e.g., two), the UE may perform down-selection to select two TCI states from the first group G1 as first TCI states to meet the first threshold number. For example, TCI states #1 and #7 may be selected as first TCI states based on at least one of the rules (1) to (11) described above in the section labeled "BFD RS Selection for Implicit Configuration." The UE may determine first BFD RS(s) for detecting a first beam failure condition of the first TRP (e.g., whether the signal quality to the first TRP is lower than a predetermined threshold) based on the first TCI states.

For the second TRP, since the total number of TCI states included in the second group G2 is "three," which is larger than a second threshold number (e.g., two), the UE may perform down-selection to select two TCI states from the second group G2 as second TCI states to meet the second threshold number, based on at least one of the rules (1) to (11) described above in the section labeled "BFD RS Selection for Implicit Configuration." The UE may then determine second BFD RS(s) for detecting a second beam failure condition of the second TRP (e.g., whether the signal quality to the second TRP is lower than a predetermined threshold) based on the second TCI states.

The present disclosure provides method(s) for BFD RS determination. The method(s) is more flexible and is applicable for advanced scenarios compared with, e.g., Rel-15/Rel-16 NR scenarios. At least part of the method(s) disclosed herein at least supports beam failure recovery for scenarios where a larger number of TCI states are associated with configured CORESETs for an active BWP, but without the penalty of increased UE complexity.

The following may be used to further disclose terms, examples, embodiments, actions, and/or behaviours:

Beam failure recovery: Movements in the environment or other events, may lead to a currently established beam pair being rapidly blocked without sufficient time for the regular beam adjustment to adapt based on a beam reporting mechanism (beam reporting mechanism is similar to CSI (channel state information) reporting mechanism taken place in PHY channels). A beam failure recovery procedure deals with such occurrences with short reaction time.

Beam: The term "beam" here may be replaced by spatial filter. For example, when the UE reports a preferred gNB transmission (TX) beam, the UE is essentially selecting a spatial filter used by gNB. The term "beam information" is used to provide information about which beam/spatial filter is being used/selected. In one embodiment, individual reference signals are transmitted by applying individual beams (spatial filters). Thus, the term beam or beam information may be represented by reference signal resource index(es).

HARQ: A functionality ensures delivery between peer entities at Layer 1 (e.g., Physical Layer). A single HARQ process supports one Transport Block (TB) when the physical layer is not configured for downlink/uplink spatial multiplexing, and when the physical layer is configured for downlink/uplink spatial multiplexing, a single HARQ process supports one or multiple TBs. There is one HARQ entity per serving cell. Each HARQ entity supports a parallel (number) of DL and UL HARQ processes.

Timer: A MAC entity can setup one or more timers for individual purposes, for example, triggering some uplink signaling retransmission or limiting some uplink signaling retransmission period. A timer is running once it is started, until it is stopped or until it expires; otherwise it is not running. A timer can be started if it is not running or restarted if it is running. A Timer is always started or restarted from its initial value, wherein the initial value can be, but is not limited to be, configured by the gNB via downlink RRC signaling.

BWP: A subset of the total cell bandwidth of a cell is referred to as a Bandwidth Part (BWP) and beamwidth part adaptation is achieved by configuring the UE with BWP(s) and telling the UE which of the configured BWPs is currently the active one. To enable Bandwidth Adaptation (BA) on the PCell, the gNB configures the UE with UL and DL BWP(s). To enable BA on SCells in case of CA, the gNB configures the UE with DL BWP(s) at least (e.g., there may be none in the UL). For the PCell, the initial BWP is the BWP used for initial access. For the SCell(s), the initial BWP is the BWP configured for the UE to first operate at SCell activation. The UE may be configured with a first active uplink BWP by afirstActiveUplinkBWP IE. If the first active uplink BWP is configured for an SpCell, thefirstActiveUplinkBWP IE field contains the ID of the UL BWP to be activated upon performing the RRC (re-)configuration. If the field is absent, the RRC (re-) configuration does not impose a BWP switch. If the first active uplink BWP is configured for an SCell, thefirstActiveUplinkBWP IE field contains the ID of the uplink bandwidth part to be used upon MAC activation of an SCell.

The following may be used to further disclose terms, examples, embodiments, actions, and/or behaviors:

QCL (Quasi Co-Location): Two antenna ports are said to be quasi co-located if properties of the channel over which a symbol on one antenna port is conveyed can be inferred from the channel over which a symbol on the other antenna port is conveyed. The "properties of the channel" above may include Doppler shift, Doppler spread, average delay, delay spread, and spatial reception (RX) parameters. These properties are categorized into different QCL types in NR specifications. For example, QCL-TypeD refers to a spatial RX parameter. QCL-TypeD is also referred to "beam" in this document.

TCI state: A TCI state contains parameters for configuring a QCL relationship between one or two DL reference signals and a target reference signal set. For example, a target reference signal set may be the DM-RS ports of PDSCH or PDCCH.

Normal SR: The normal scheduling request (SR) may be used for requesting an Uplink Shared Channel (UL-SCH) resource (e.g., PUSCH resource) for new transmission. The UE may be configured with zero, one, or more normal SR configurations. A normal SR configuration may include a set of PUCCH resources for SR across different BWPs and cells. For a logical channel, at most one PUCCH resource for SR is configured per BWP. Each normal SR configuration may correspond to one or more logical channels. Each logical channel may be mapped to zero or one normal SR configuration. The normal SR configuration of the logical channel that triggered the BSR (if such a configuration exists) is considered as a corresponding normal SR configuration for the triggered SR. When a normal SR is triggered, it shall be considered as pending until it is cancelled.

Figure 10:
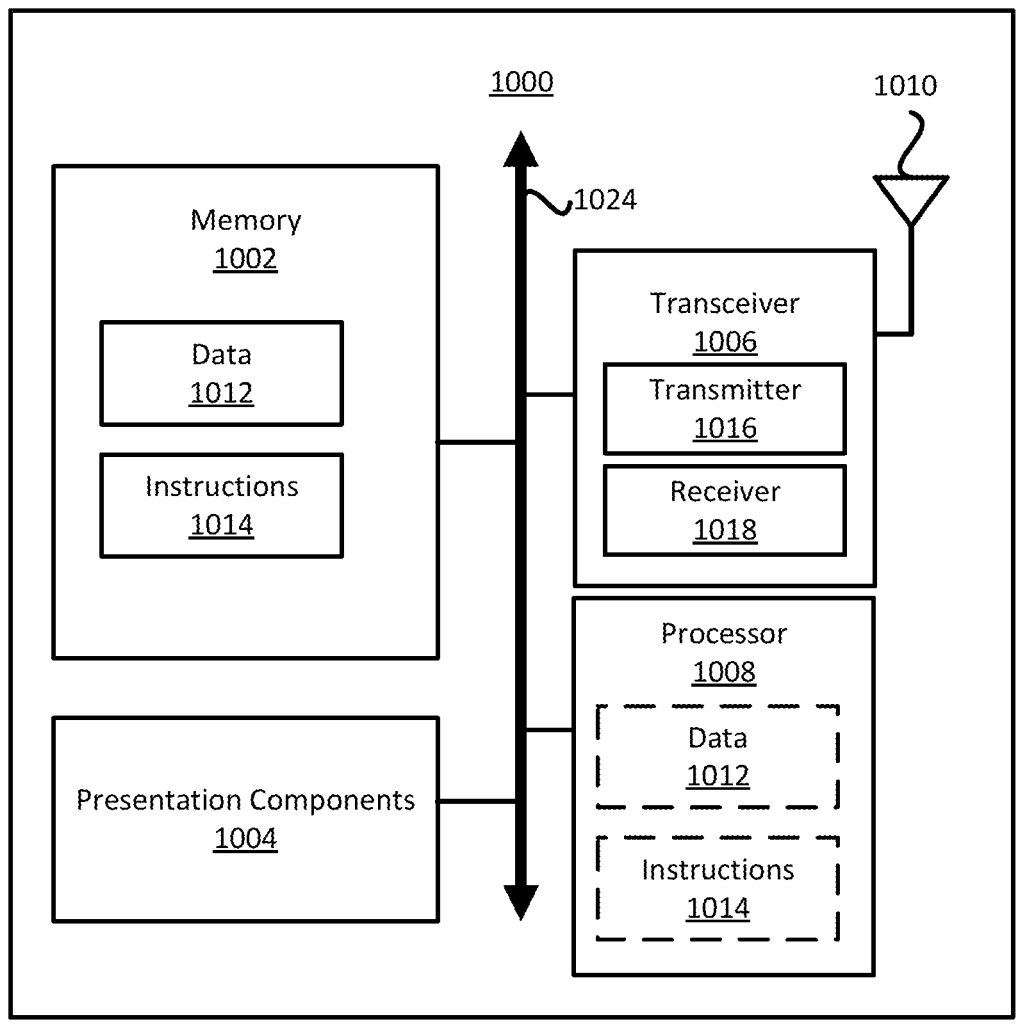
FIG. 10 illustrates a block diagram of a node for wireless communication according to an implementation of the present disclosure.

FIG. 10 illustrates a block diagram of a node 1000 for wireless communication according to an implementation of the present disclosure. As illustrated in FIG. 10, the node 1000 may include a transceiver 1006, a processor 1008, a memory 1002, one or more presentation components 1004, and at least one antenna 1010. The node 1000 may also include a radio frequency (RF) spectrum band module, a BS communications module, a network communications module, and a system communications management module, Input/Output (110) ports, I/O components, and a power supply (not explicitly illustrated in FIG. 10).

Each of these components may be in communication with each other, directly or indirectly, over one or more buses 1024. The node 1000 may be a UE or a BS that performs various functions described herein, for example, with reference to FIGS. 1 through 9.

The transceiver 1006 having a transmitter 1016 (e.g., transmitting/transmission circuitry) and a receiver 1018 (e.g., receiving/reception circuitry) may be configured to transmit and/or receive time and/or frequency resource partitioning information. The transceiver 1006 may be configured to transmit in different types of subframes and slots, including, but not limited to, usable, non-usable and flexibly usable subframes and slot formats. The transceiver 1006 may be configured to receive data and control channels.

The node 1000 may include a variety of computer-readable media. Computer-readable media can be any available media that can be accessed by the node 1000 and include both volatile (and non-volatile) media and removable (and non-removable) media. By way of example, and not limitation, computer-readable media may include computer storage media and communication media. Computer storage media may include both volatile (and/or non-volatile) and removable (and/or non-removable) media implemented according to any method or technology for storage of information, such as computer-readable instructions, data structures, program modules, or data.

Computer storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer storage media do not include a propagated data signal.

Communication media may typically embody computer-readable instructions, data structures, program modules, or other data in a modulated data signal, such as a carrier wave or other transport mechanisms and include any information delivery media. The term "modulated data signal" may mean a signal that has one or more of its characteristics set or changed in such a manner as to encode information in the signal. By way of example, and not limitation, communication media may include wired media, such as a wired network or direct-wired connection, and wireless media, such as acoustic, RF, infrared, and other wireless media. Combinations of any of the previously disclosed communication media should also be included within the scope of computer-readable media.

The memory 1002 may include computer storage media in the form of volatile and/or non-volatile memory. The memory 1002 may be removable, non-removable, or a combination thereof. For example, the memory 1002 may include solid-state memory, hard drives, optical-disc drives, etc. As illustrated in FIG. 10, the memory 1002 may store computer-readable and/or computer-executable instructions 1014 (e.g., software code(s) or computer-executable program(s)) that are configured to, when executed, cause the processor 1008 to perform various functions described herein, for example, with reference to FIGS. 1 through 9. Alternatively, the instructions 1014 may not be directly executable by the processor 1008 but may be configured to cause the node 1000 (e.g., when compiled and executed) to perform various functions described herein.

The processor 1008 (e.g., having processing circuitry) may include an intelligent hardware device, a Central Processing Unit (CPU), a microcontroller, an ASIC, etc. The processor 1008 may include memory. The processor 1008 may process the data 1012 and the instructions 1014 received from the memory 1002, and information through the transceiver 1006, the baseband communications module, and/or the network communications module. The processor 1008 may also process information to be sent to the transceiver 1006 for transmission through the antenna 1010, to the network communications module for transmission to a CN.

One or more presentation components 1004 may present data indications to a person or other devices. Examples of presentation components 1004 may include a display device, speaker, printing component, vibrating component, etc.

From the present disclosure, it is manifested that various techniques may be used for implementing the concepts described in the present application without departing from the scope of those concepts. Moreover, while the concepts have been disclosed with specific reference to certain implementations, a person of ordinary skill in the art would recognize that changes may be made in form and detail without departing from the scope of those concepts. As such, the disclosed implementations are to be considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A method performed by a User Equipment (UE) configured with more than one Transmission/Reception Point (TRP) in an active Bandwidth Part (BWP) for determining a Beam Failure Detection (BFD) Reference Signal (RS), the method comprising:

receiving at least one Medium Access Control (MAC) Control Element (CE) for Transmission Configuration Indicator (TCI) state activation, each of the at least one MAC CE indicating a Control Resource Set (CORESET) and at least one TCI state to be activated for monitoring a Physical Downlink Control Channel (PDCCH) associated with a physical resource, the physical resource being determined by a configuration of the CORESET indicated by a same MAC CE, one of the at least one MAC CE indicating more than one TCI state, at least a subset of all TCI states indicated by the at least one MAC CE belonging to a first group of TCI states associated with a first TRP; and performing first operations after determining that a total number of TCI states included in the first group of TCI states is larger than a first threshold number, the first operations including:

selecting at least one first TCI state from the first group of TCI states, a total number of the at least one first TCI state being equal to the first threshold number; and determining at least one first BFD RS for detecting a first beam failure condition of the first TRP based on the at least one first TCI state.

2. The method according to claim 1, wherein at least another subset of all TCI states indicated by the at least one MAC CE belongs to a second group of TCI states associated with a second TRP, the method further comprising:

performing second operations after determining that a total number of TCI states included in the second group of TCI states is larger than a second threshold number, the second operations including:

selecting at least one second TCI state from the second group of TCI states, a total number of the at least one second TCI state being equal to the second threshold number; and determining at least one second BFD RS for detecting a second beam failure condition of the second TRP based on the at least one second TCI state.

3. The method according to claim 2, wherein:
the one of the at least one MAC CE includes a serving cell Identifier (ID), a CORESET ID, a first TCI state ID, and a second TCI state ID,
the first TCI state ID indicates a TCI state belonging to the first group of TCI states, and
the second TCI state ID indicates a TCI state belonging to the second group of TCI states.

4. The method according to claim 1, wherein the one of the at least one MAC CE has a fixed-sized format for indicating two TCI states for PDCCH monitoring.

5. The method according to claim 1, wherein the one of the at least one MAC CE has a variable-sized format for indicating at least two TCI states for PDCCH monitoring.

6. The method according to claim 5, wherein the one of the at least one MAC CE further includes an indicator for indicating existence of an octet which includes a third TCI state ID.

7. The method according to claim 1, wherein in the first group of TCI states, a TCI state that is associated with a CORESET having a lowest monitoring periodicity among all CORESETs associated with the first group of TCI states is prioritized to be selected as one of the at least one first TCI state.

8. The method according to claim 1, wherein in the first group of TCI states, a TCI state that is associated with a CORESET indicated by the one of the at least one MAC CE is prioritized to be selected as one of the at least one first TCI state.

9. The method according to claim 8, wherein:
the one of the at least one MAC CE includes a plurality of TCI state IDs,
a TCI state ID of the plurality of TCI state IDs indicates the TCI state that is prioritized to be selected as the one of the at least one first TCI state, and
a Most Significant Bit (MSB) of the TCI state ID is closest, among all MSBs of the plurality of TCI state IDs included in the one of the at least one MAC CE, to an MSB of a bit string represented by the one of the at least one MAC CE.

10. A User Equipment (UE) configured with more than one Transmission/Reception Point (TRP) in an active Bandwidth Part (BWP) for determining a Beam Failure Detection (BFD) Reference Signal (RS), the UE comprising:

at least one processor; and at least one memory coupled to the at least one processor, wherein the at least one memory stores at least one computer-executable program that, when executed by the at least one processor, causes the UE to:

receive at least one Medium Access Control (MAC) Control Element (CE) for Transmission Configuration Indicator (TCI) state activation, each of the at least one MAC CE indicating a Control Resource Set (CORESET) and at least one TCI state to be activated for monitoring a Physical Downlink Control Channel (PDCCH) associated with a physical resource, the physical resource being determined by a configuration of the CORESET indicated by a same MAC CE, one of the at least one MAC CE indicating more than one TCI state, at least a subset of all TCI states indicated by the at least one MAC CE belonging to a first group of TCI states associated with a first TRP; and perform first operations after determining that a total number of TCI states included in the first group of TCI states is larger than a first threshold number, the first operations including:

selecting at least one first TCI state from the first group of TCI states, a total number of the at least one first TCI state being equal to the first threshold number; and determining at least one first BFD RS for detecting a first beam failure condition of the first TRP based on the at least one first TCI state.

* * * * *